United States Patent
Fairman et al.

(10) Patent No.: US 7,209,560 B1
(45) Date of Patent: Apr. 24, 2007

(54) DATA COMMUNICATIONS

(75) Inventors: Ian R Fairman, Ipswich (GB); Robert J Briscoe, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/555,929

(22) PCT Filed: Dec. 15, 1998

(86) PCT No.: PCT/GB98/03753

§ 371 (c)(1),
(2), (4) Date: Jun. 6, 2000

(87) PCT Pub. No.: WO99/33242

PCT Pub. Date: Jul. 1, 1999

(30) Foreign Application Priority Data

| Dec. 19, 1997 | (EP) | ................................. | 97310358 |
| Dec. 19, 1997 | (GB) | ................................. | 9726934.4 |
| Jun. 4, 1998 | (EP) | ................................. | 98304429 |
| Jun. 4, 1998 | (GB) | ................................. | 9812060.3 |

(51) Int. Cl.
*H04L 9/00* (2006.01)

(52) U.S. Cl. ...................................... 380/255; 380/262
(58) Field of Classification Search ........ 713/200–201, 713/160–161, 165, 170; 380/201, 203, 228–229, 380/232, 235, 255, 262; 709/226, 217, 233; 235/384; 726/2, 5, 18, 27
See application file for complete search history.

(56) References Cited

U.S. PATENT DOCUMENTS

| 5,148,485 | A |   | 9/1992 | Dent ........................... 380/46 |
| 5,301,233 | A |   | 4/1994 | Coutrot et al. .............. 380/239 |
| 5,467,134 | A | * | 11/1995 | Laney et al. ............. 348/409.1 |
| 5,483,598 | A |   | 1/1996 | Kaufman et al. ............. 380/43 |

(Continued)

FOREIGN PATENT DOCUMENTS

EP  0 528 730 A1  2/1993

(Continued)

OTHER PUBLICATIONS

Popp et al., "Security Services for Telecommunications Users", Bringing Telecommunication Services to the People—ISS & N 1995, Third International Conference on Intelligence in Broadband Service and Networks, Heraklion, Crete, Oct. 16-19, 1995, Proceedings, No. Conf. 3, Oct. 16, 1995, pp. 28-39, XP 000593466.

(Continued)

*Primary Examiner*—Gilberto Barrón, Jr.
*Assistant Examiner*—Leynna Ha
(74) *Attorney, Agent, or Firm*—Nixon & Vanderhye, P.C.

(57) ABSTRACT

In a data communications system a remote data source outputs data as a series of application data units (ADUs). Each ADU is individually encrypted with a different key. The keys are transmitted (for example using Internet multicasting) via a communications network to one or more customer terminals. At the terminals a sequence of keys is generated for use in decrypting the ADUs. A record is kept of the keys generated, and this record may subsequently be used to generate a receipt for the data received by the customer. The keys may be generated, and the record stored within a secure module such as a smartcard.

25 Claims, 12 Drawing Sheets

U.S. PATENT DOCUMENTS

| | | | |
|---|---|---|---|
| 5,544,161 A | 8/1996 | Bigham et al. | 370/397 |
| 5,584,023 A * | 12/1996 | Hsu | 707/204 |
| 5,652,868 A * | 7/1997 | Williams | 703/23 |
| 5,710,815 A * | 1/1998 | Ming et al. | 380/241 |
| 5,787,179 A * | 7/1998 | Ogawa et al. | 380/46 |
| 5,852,664 A * | 12/1998 | Iverson et al. | 705/51 |
| 5,937,067 A * | 8/1999 | Thatcher et al. | 380/212 |
| 5,960,081 A * | 9/1999 | Vynne et al. | 713/176 |
| 5,991,279 A * | 11/1999 | Haugli et al. | 370/311 |
| 6,052,786 A * | 4/2000 | Tsuchida | 726/14 |
| 6,055,314 A | 4/2000 | Spies et al. | 380/242 |
| 6,178,512 B1 * | 1/2001 | Fifield | 726/1 |
| 6,222,924 B1 * | 4/2001 | Salomaki | 380/200 |
| 6,285,774 B1 * | 9/2001 | Schumann et al. | 382/100 |
| 6,351,538 B1 * | 2/2002 | Uz | 380/201 |
| 6,400,827 B1 * | 6/2002 | Rhoads | 382/100 |
| 6,580,906 B2 * | 6/2003 | Bilgic et al. | 455/422.1 |
| 6,782,473 B1 * | 8/2004 | Park | 713/160 |
| 6,882,729 B2 * | 4/2005 | Arling et al. | 380/274 |
| 6,925,181 B2 * | 8/2005 | Kohn et al. | 380/213 |

FOREIGN PATENT DOCUMENTS

| | | |
|---|---|---|
| EP | 0 534 419 A2 | 3/1993 |
| WO | WO 93/09627 | 5/1993 |
| WO | 97/26611 | 7/1997 |
| WO | WO 97/34426 | 9/1997 |

OTHER PUBLICATIONS

Bottura, Charging and Tariffing Functions and Capabilities for MANs' Proceedings of the Network Operations and Management Symposium (NOM, Memphis, Apr. 6-9, 1992, vol. 1, Jan. 1, 1992, pp. 208-218.

Coffey et al., "Non-Repudiation with Mandatory Proof of Receipt", Computer Communications Review, vol. 26, No. 1, Jan. 1, 1996, pp. 6-17, XP 000580016.

* cited by examiner

Figure 10A

| data | 7 | 6 | 5 | 4 | 3 | 2 | 1 |
|------|---|---|---|---|---|---|---|

Figure 10B

| data | 6 | 5 | 4 | 3 | 2 | 1 |
|------|---|---|---|---|---|---|

DATA COMMUNICATIONS

BACKGROUND OF INVENTION

1. Field of Invention

The present invention relates to a data communications system, and in particular to the control of access by users to copies of digitally encoded data. It is applicable, for example, to the control of data multicast on the internet.

2. Description of Related Art

Multicasting routing techniques have been developed to allow multiple copies of a data item to be distributed efficiently to a large number of end users. However, for such techniques to be exploited commercially, it necessary to control selectively access by users to the data. For example, in an application in which selected stock market prices are multicast via the internet to subscribers, it is necessary to ensure that the data is accessed only by users who have paid the relevant subscription. This might be achieved by encrypting the data and only releasing the relevant key to the user in return for the subscription payment. However, whenever one user's subscription expires, after a fixed length of time or after a predetermined quantity of data has been received, it would be necessary to change the key for all the users, in order to exclude the one user. In such a situation, the traffic associated with key distribution becomes a significant operating overhead, and may even exceed the traffic for the data itself.

BRIEF DESCRIPTION OF THE INVENTION

According to a first aspect of the present invention, there is provided a method of distributing digitally encoded data, comprising:

dividing said data into a multiplicity of frames,
encrypting said frames,
distributing multiple copies of the said data frames to a multiplicity of users,
communicating a seed value for key generation to respective secure modules located at each of the multiplicity of users,
decoding the data frames at respective users using keys derived from the seed value communicated to the secure module,
passing a control message to the secure module at a selected one or more of the multiplicity of users,
at the or each selected user, in response to the said control message,
controlling the availability of keys generated from the said seed value, thereby selectively controlling access by the users to the said data.

The term "frame" as used in this document denotes an application-level entity, sometimes referred to as an Application Data Unit (ADU), and is to be distinguished from, e.g., conventional video "frames". The terms Application Data Unit and frame are used equivalently in this document.

The method of the present invention provides full and effective control of access by users to data, without imposing heavy communication overheads. This is achieved by dividing the data item into frames, individually encrypting the frames with a series of keys, and using a controlled secure module at the customer location to generate the corresponding series of keys required to decrypt the received data. The secure module is controlled to limit the availability of the keys. For example, an initial set-up message to the secure module may instruct it only to generate a limited number of keys, say one hundred. If the user subsequently pays to extend their subscription, then a further control message may be sent to the secure module to allow the generation of further keys from the existing seed value.

The invention includes, but is not limited to, data communications systems in which the frames or "ADU's" are communicated over, e.g., a federated public data network such as the Internet. It also encompasses systems in which the step of communicating ADU's is carried out, e.g., by physically distributing a data carrier such as a CD-ROM containing the ADU's. The data on the distribution medium may be separated into frames each with a sequence number and each encrypted with a different key. During reading of data from the data carrier the secure module would generate keys, and this may be done off-line. An on-line connection may still be required, e.g. in order to request a receipt and for transmission of a response to such a request.

Although the invention is suitable for use in a multicast data communications network, it is also applicable in a wide range of other contexts, wherever it is necessary control access to a widely distributed data items. Possible applications include multicast audio/video streams for Video-on-Demand, network radio or surveillance; controlling access to the contents of CD ROMS or other storage media carrying software or multimedia data; controlling access to a set of vouchers giving access to other services; a multicast stream of messages such as stock prices, communications network prices, electricity prices, network management messages, news items, portfolio information, team briefings, standards documents, academic papers, magazines, product reviews, black lists, criminal intelligence, legal precedents, property profiles, pharmaceutical test results etc; a sequence of multicast messages within a network game, virtual world or simulation scenario (e.g. an aptitude exam), possibly just those messages that control access, but also possibly any data messages for which proof of reception is crucial to the fairness of the result of the simulation.

Control messages are preferably, but not necessarily distributed on-line. They may be distributed by any suitable means (e.g. on plastic cards, bar-codes, microdots, floppy disks etc.).

Preferably a control field is distributed to each of the multiplicity of users, and the secure module is arranged to enable decryption of a respective frame only when the said control field has been passed to the secure module. Preferably the said control message for modifying the availability of keys is communicated to the secure module in the said control field.

These preferred features of the invention, make it more difficult for the user to circumvent the control exercised through the key generation system. By passing a control field to the secure module with each frame, and only allowing decryption when the control field is received they protect against interruption of the control channel to the secure module.

Preferably, each data frame includes a frame identity field, and each key generated by the secure module is specific to one frame identified by the said field.

As is further discussed below, the security of the system is further enhanced by including a frame identity field, and making the process of decryption dependent on the frame identity.

The method may include generating and storing a receipt for each frame decrypted by the user. The use of receipts generated in this manner is described and claimed in the present applicant's co-pending British Patent Application number 9726934.4, filed 19.12.97, Agent's reference A25546. The contents of that earlier application are incorporated herein by reference.

The user may receive and process the data frames using an appropriate terminal such as a personal computer or any other appropriate device, such as, for example, a Java-enabled mobile cellular telephone. The secure module provides a region in the customer terminal which is effectively under the control of the data provider, and which is not readily accessible to the customer. The secure module may simply be a software module which executes a cryptographic algorithm. This might be implemented, for example, as a Java program distributed by the operator of the remote data source as part of the process of setting up a session. To provide still higher levels of security, it is preferred that the secure module should include a dedicated processor and store located, optionally but not necessarily, within a physically secure housing. Examples of such secure modules include smartcard structures, and cryptographic PC cards.

When the secure module has only a relatively low processing power, as may be the case, for example, when it is a smartcard, then preferably that module is required simply to output the different respective keys. Other processes running in the main part of the customer terminal are then responsible for decrypting the data frames. Alternatively, when the secure module has more processing power, as when, for example, a cryptographic co-processor card is used, then preferably the encrypted data frames are passed to the secure module and the module generates the respective keys, decrypts the frames, and passes the decrypted frames out, for example, to an application program running on the customer terminal.

Preferably the control message is distributed with a data frame to the multiplicity of users, a user identity field identifying a selected user or group of users is included in the control message, and the control message is acted on only by the user or group of users identified by the said user identity field. The control message may include a stop flag and a contact sender flag. For example, the contact sender flag might be used to initiate a remote procedure call from the customer terminal to the data source, allowing a new key generation policy to be communicated to the terminal.

The method may include applying digital watermarks, that is different characteristic variations to data decrypted at different respective customer terminals. This serves to make possible the detection of fraud by collusion, for example by one customer forwarding key values or decrypted data to another customer.

According to a second aspect of the present invention, there is provided a data communications system comprising:

a) a remote data source arranged to output a plurality of frames;

b) encryption means for encrypting the plurality of frames with different respective keys;

c) a communications channel arranged to distribute multiple copies of the encrypted data frames;

d) a multiplicity of customer terminals arranged to receive from the communications channel respective copies of the encrypted data frames;

e) a key generator located at a customer terminal and programmed to generate from a seed value keys for use in decrypting data frames:

f) key control means connected to the key generator, the key control means comprising:

an interface for receiving control messages; and control means responsive to the said control messages and arranged to control the availability to the user of keys generated from the seed value; and g) decryption means connected to the key generator and arranged to decrypt the data frames received at the customer terminal from the communications channel.

According to another aspect of the present invention, there is provided a method of distributing digitally encoded data, comprising a) dividing said data into a multiplicity of frames, b) encrypting said frames, c) marking frames with a frame type field, d) communicating said data frames to a user, e) communicating a seed value for key generation to the user, f) decoding the data frames at the users using keys derived from the seed value, and g) generating and storing receipts for said data frames, said frames including frame type data from the frame type field.

The invention also encompasses customer terminals and data servers adapted to implement the invention in any of its aspects. It also encompasses methods and systems in which data is sourced from a plurality of different data sources.

BRIEF DESCRIPTION OF THE DRAWINGS

Systems embodying the present invention will now be described in further detail, by way of example only, with reference to the accompanying drawings in which:

FIGS. 10*a* and 10*b* shows the structure of a data frame;

DETAILED DESCRIPTION OF EXEMPLARY EMBODIMENTS

Figure 1:
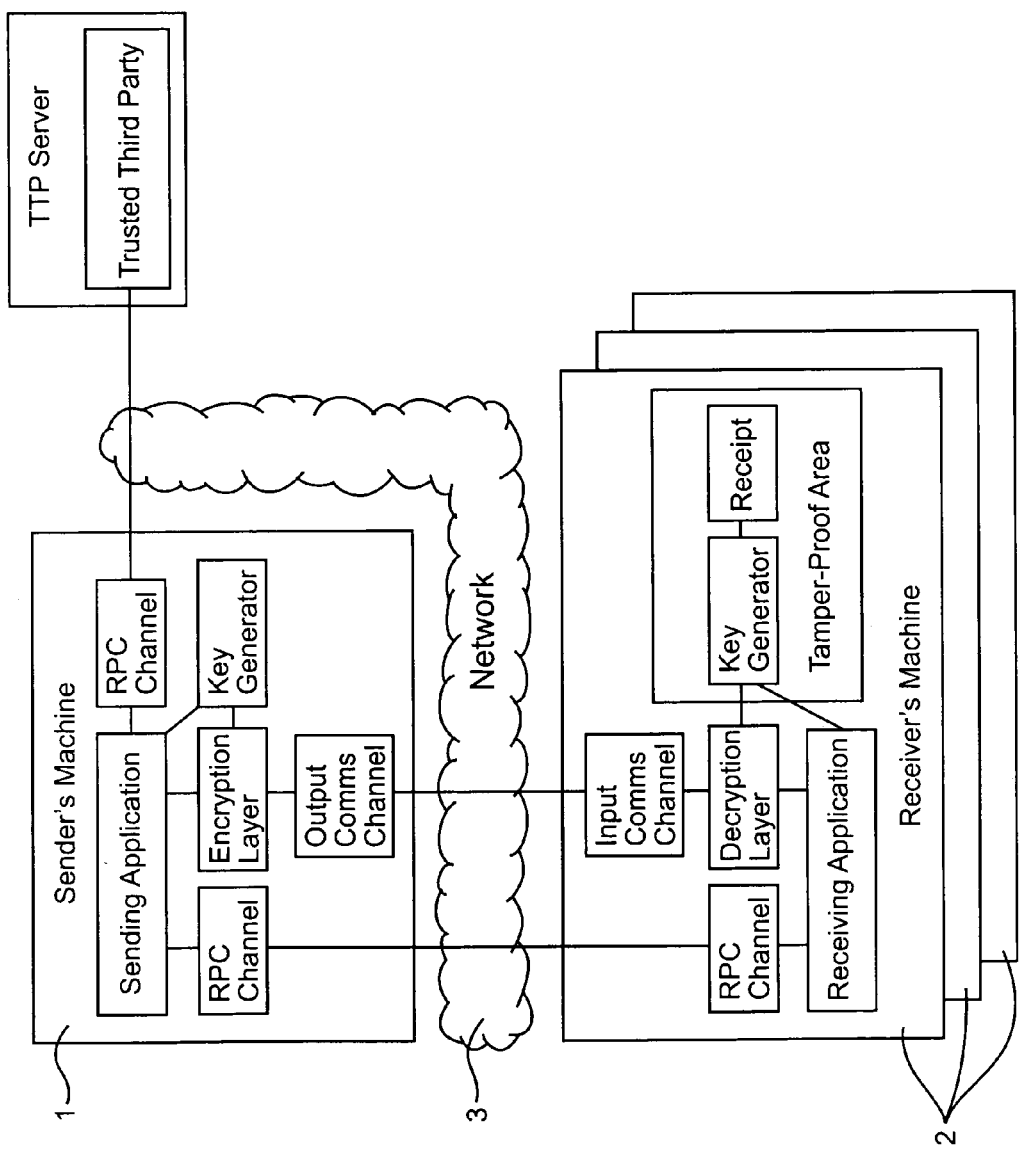
FIG. 1 is a schematic of a data communication system embodying the network.

As shown in FIG. 1, a data communications system includes a data server 1 ("sender's machine") connected to a number of customer terminals 2 via a data communications network 3. Although for ease of illustration only a few customer terminals are shown, in practice the data server 1 may communicate simultaneously with many terminals. In the present example, the data communications network 3 is the public Internet. The sub-networks and the associated routers connecting the data server to the customer terminals support IP (Internet Protocol) multicasting.

In the present example, the data server 1 is a video server. The data server reads a video data stream from a mass storage device and compresses the data using an appropriate compression algorithm such as MPEG 2. An encryption module in the data server 1 then divides the compressed video data stream into frames. For example each frame may comprise data corresponding to one minute of the video signal. An encryption algorithm, such as that described in further detail below, then encrypts the frames of data. A common encryption algorithm is used for all of the frames in one session. However, a sequence of keys is used, with a different key for each successive frame.

At each customer terminal, incoming data frames are processed using a secure module 4. As described in further detail below, the secure module 4 generates a sequence of keys corresponding to those used originally to encrypt the data frames. The number of keys to be generated in a given session are determined by a contract between the user and the operator of the data server. For example, in the case of video-on-demand, the user might select program material, in response to which the server identifies the number of keys required to decrypt all the frames in the program, and the cost of the program. In return for payment from the user, the server sends the seed value for the key, together with a control instruction for the secure module to generate the required number, e.g. one hundred, of the keys. The keys may be passed out to the main processor of the customer terminal to allow the data to be decrypted. Alternatively, the secure module itself may carry out the step of decryption. In either case, the secure module stores a record of the keys generated. This record may comprise, for example, a count of the total number of keys issued in the course of a session, together with a session ID and a record of the time of the session.

During the course of the session, control signals may be sent to modify the access rights of the customer. For example, the user might choose to quit a program at an early stage and to gain a refund. This is effected by transmitting from the data server a data frame which contains, in addition to the data itself, a control message including the identity of the particular customer or group of customers whose access rights are to be modified. The control message may include a simple "stop" flag which, when set causes the secure module to cease releasing keys. Possible formats for the communication of control signals are discussed in further detail below with respect to FIGS. 10A and 10B. Conversely, the user might choose to view additional program material, in which case a control message may be sent to the secure module to increase the number of keys to be generated e.g. from 100 to 200. Other changes in status are also possible. The frames may include a meta-data field which may be used to distinguish, for example, between different classes of subscriber. For example, subscribers might be divided into gold, silver and bronze classes, with gold users having access to data frames having meta-data values m1, m2 or m3, silver users having access to m1 or m2, and bronze users having access to m1 only. In return for payment during the course of a session, the user might upgrade their subscription e.g. from bronze to silver, and thereby gain access to program material carried in frames with m2 meta-data values in addition to material carried in frames with m1 metadata values. The change is effected by the data server transmitting a control message to the secure module mandating key generation for m2 frames in addition to m1 frames.

Each data frame or ADU may be sent with a frame type that allows the frames to be receipted or controlled in different ways. For example, a user may pay to watch an hour's worth of a video stream, but with adverts and credits not counting within that hour. Each frame in this case includes a type, that may be signed or encrypted, with another key sequence, that identifies the frame as relating to chargeable or non-chargeable data. An advertiser may pay for the network transmission cost of, e.g. adverts, on condition that the user returns their receipt. This mechanism may also be used in systems of the type where a user is paid to receive advertisements.

Prior to commencing a session, a customer terminal 3 may have contracted with the operator of the data network 2 for a quality of service (QoS) which requires a specified minimum number of frames to be delivered per unit time. If subsequently, congestion in the network 2 causes the rate of frame delivery to fall below that specified in the contract, then the customer terminal 3 request from the data server 1 a refund of charges for the session. To validate this request, the data server 1 requests from the secure module 4 a "receipt". This receipt includes the data recorded in the data store and so provides a tamper-proof indication of the number of frames decrypted and made available to the customer in the course of a specified session.

Figure 2:
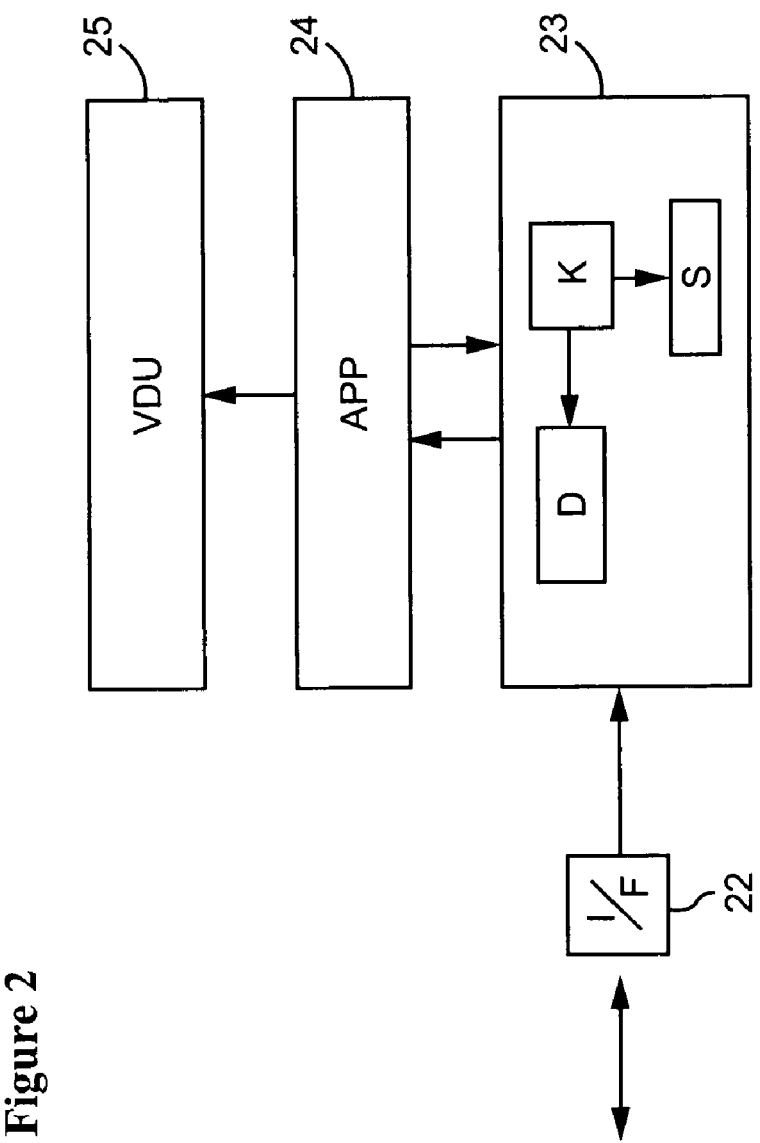
FIG. 2 is a schematic showing in further detail the functional components of the customer terminal in the system of FIG. 1.

FIG. 2 shows the principal functional components of the customer terminal relevant to the present invention. A network interface 22 communicates data frames to and from the data network. The data frames pass from the interface 22 to a secure module 23. The secure module 23 has sub modules comprising a decryption module D, a key generation module K and a secure store S. The key generation module passes a series of keys to the decryption module which decrypts a series of data frames received from the interface 22 and passes these to an application layer module 24. This carries out further processing and passes the resulting data to an output device, which in this example is a video display unit VDU 25. In a preferred implementation, the interface 22 may be embodied in hardware by an ISDN modem and in software by a TCP-IP stack. The secure module 23 may be, for example, a smartcard which is interface to the customer terminal via a PCMCIA socket. The smartcard may use one of a number of standard data interfaces such as the Java card API (application programmer's interface) of Sun Microsystems, or the Microsoft smartcard architecture. Alternatively, the secure module may be embodied by a PCI cryptographic co-processor card such as that available commercially from IBM.

Figure 8:
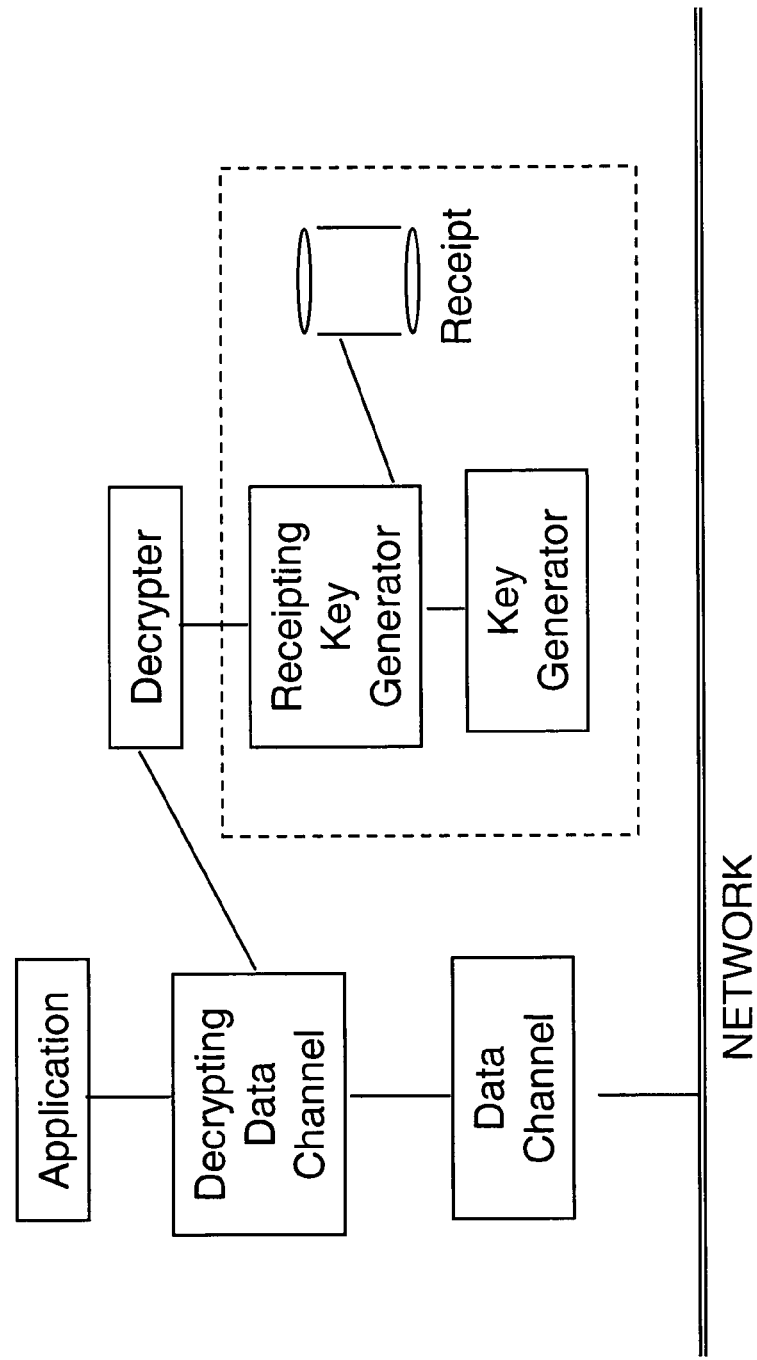
FIG. 8 shows the software architecture of the customer terminal.

FIG. 8 illustrates a software architecture for the customer terminal. The application layer on the terminal is supported by a decrypting data channel which in turn overlies a data channel layer connected e.g. to a network. The decrypting data channel has associated with a decrypter module. This decrypter module calls resources in a secure module (shown within dashed box) comprising a receipting key generator a key generator, and a receipt store. It will be understood that this architecture is given by way of example only, and alternatives are possible within the scope of the invention. For example, the receipt store may be outside the secure module.

Figure 9:
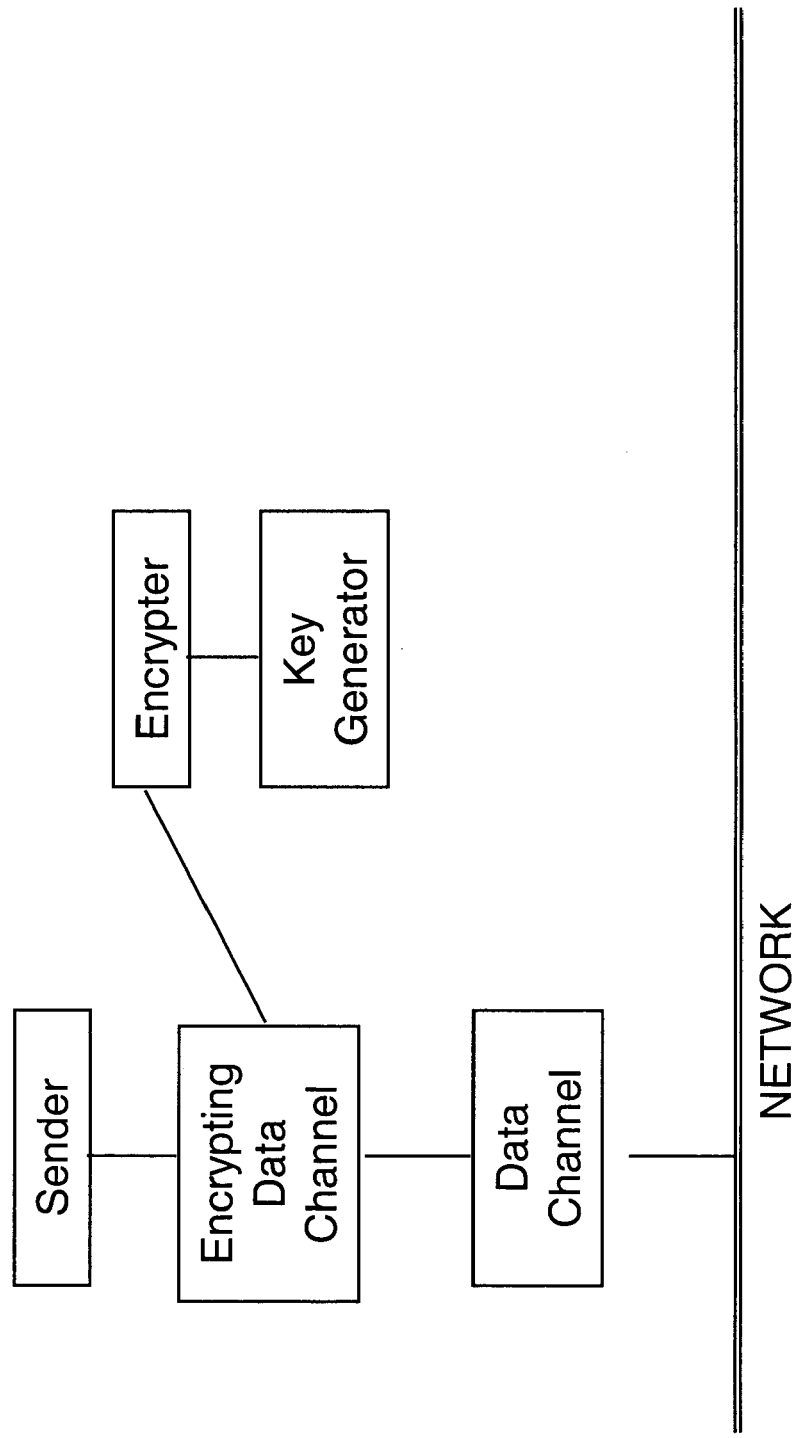
FIG. 9 shows the software architecture of the data server.

FIG. 9 shows a corresponding architecture for a data server. This comprises the sender, the encrypting data channel, the encrypter and the key generator.

Figure 3:
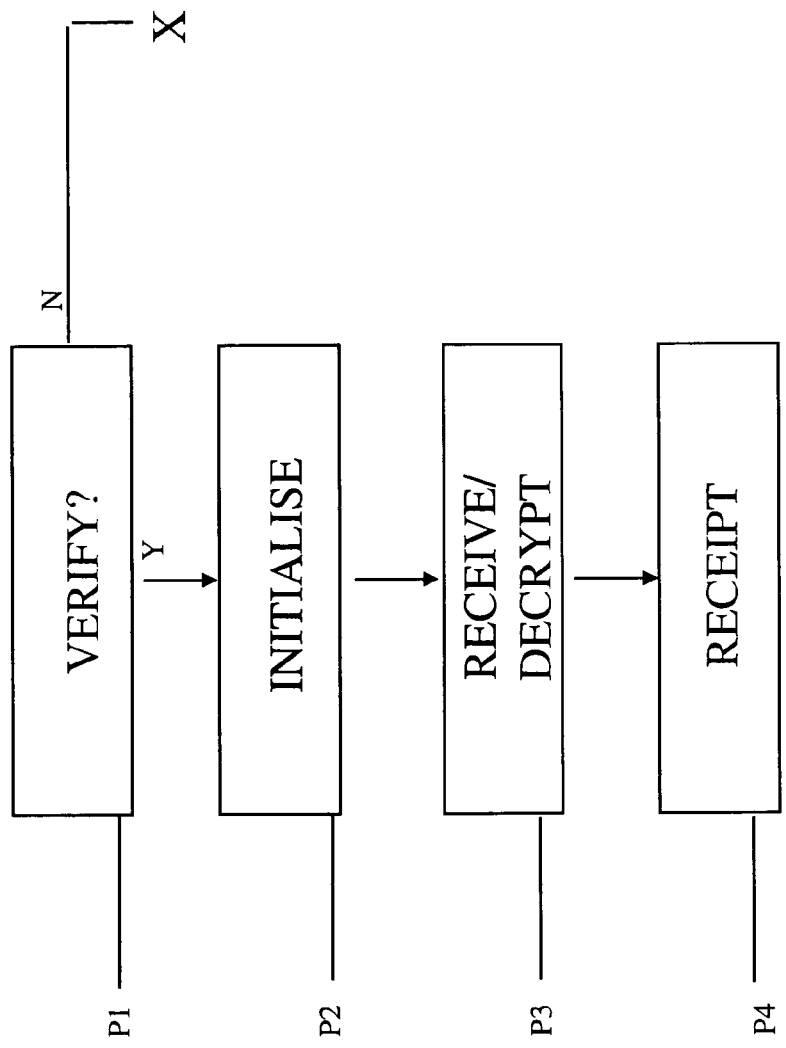
FIG. 3 is a flow diagram showing the principal phases of operation of the system of FIG. 1.

FIG. 3 shows the main phases in the operation of the system described above. In phase P1, the server verifies that the secure module in the customer terminal is trustworthy and has a recognised identity. In phase P2 the secure module is initialised to decode data for a particular session. In phase P3 the data is transmitted and decryption carried out. During this phase a control message may be sent to the control module, for example to modify the number of frames which the user is allowed access to. In stage P4, which is optional, a receipt is generated. These phases will now be described in further detail.

Figure 4:
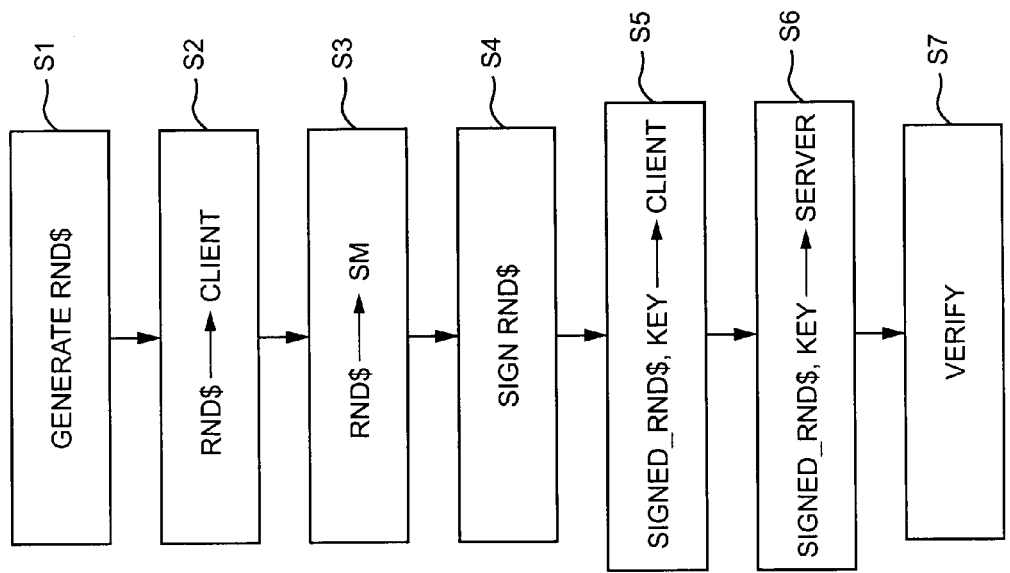
FIG. 4 is a flow diagram showing in further detail the verification phase.

When the secure module is, for example, a smartcard, then that smartcard is issued by the manufacturer with a unique public/private key pair. This key pair may be certified by a trusted third party. In phase P1, the server carries out steps to confirm that the smartcard does indeed come from a trusted supplier. The steps of phase P1 are shown in FIG. 4. In step S1 the server generates a random string. In step S2, the server sends the random string via the data network to the customer terminal. In step S3, the random data string is passed to the secure module (e.g. the smartcard). In step S4 the smartcard signs the random string. In step S5 the smartcard returns the signed string together with the relevant public key to the client application running on the customer terminal. In step S6, that client application returns the signed string and the public key via the data communications network to the server. In step S7 the server verifies the signed random string.

Figure 5:
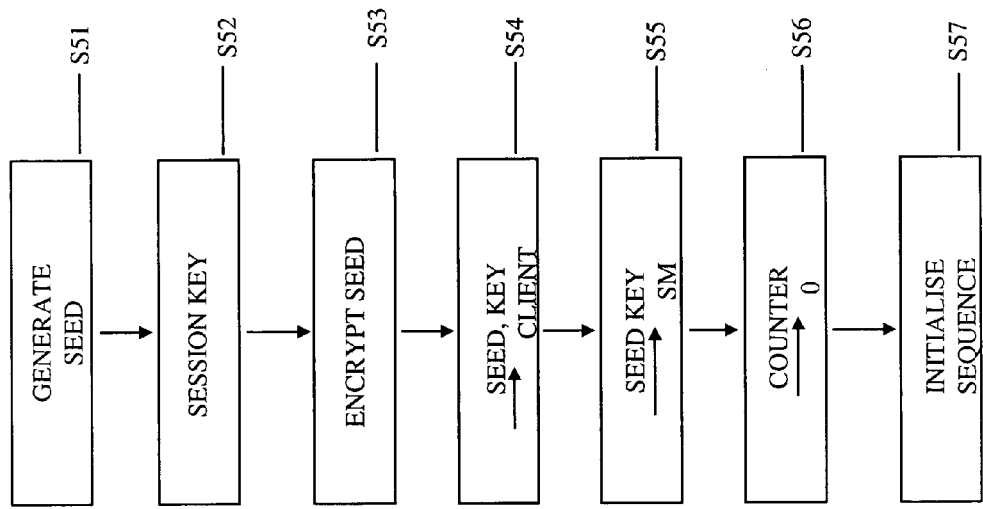
FIG. 5 is a flow diagram showing in further detail the initialisation phase.

As shown in FIG. 5, to set up the secure module to decode data in a particular session, the server first generates (s51) a seed value for use with an appropriate pseudo-random or chaotic function to generate a series of keys. It also generates a session key (s52). The server encrypts the seed value and a maximum number of keys to be generated using the secure module's public key (s3). It then transmits the encrypted seed value and maximum number of keys to be generated and the session key, to the customer terminal (s54). The client application passes the seed value and session key on to the secure module (s55). The secure module sets a packet counter to zero (s56) and initialises a sequence generator with the seed value (s57). The customer terminal is then ready to receive and decrypt data frames.

Figure 6:
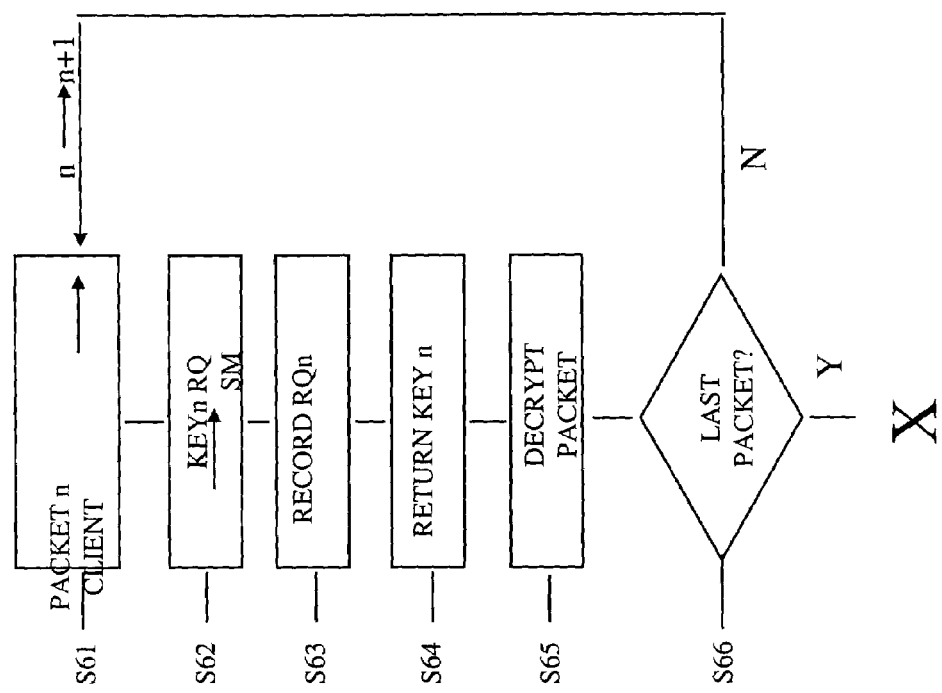
FIG. 6 is a flow diagram showing in further detail the received/decrypt phase.

The server subsequently sends a series of frames to the client. Each frame has a frame number (also termed herein the packet number). Each frame might also have a session key transmitted with it. The sequence of steps for the nth frame is illustrated in FIG. 6. In step s61 the server sends the encrypted nth frame to the client. The client requests the key x for frame n from the secure module (s62). The secure module records the request (s63). The smartcard then returns the key x to the client (s64). The client deciphers the frame using x (s65). The client tests to determine with the frame is the last of a session (s66). If not then the steps are iterated for the n+1th and subsequent frames.

Figure 7:
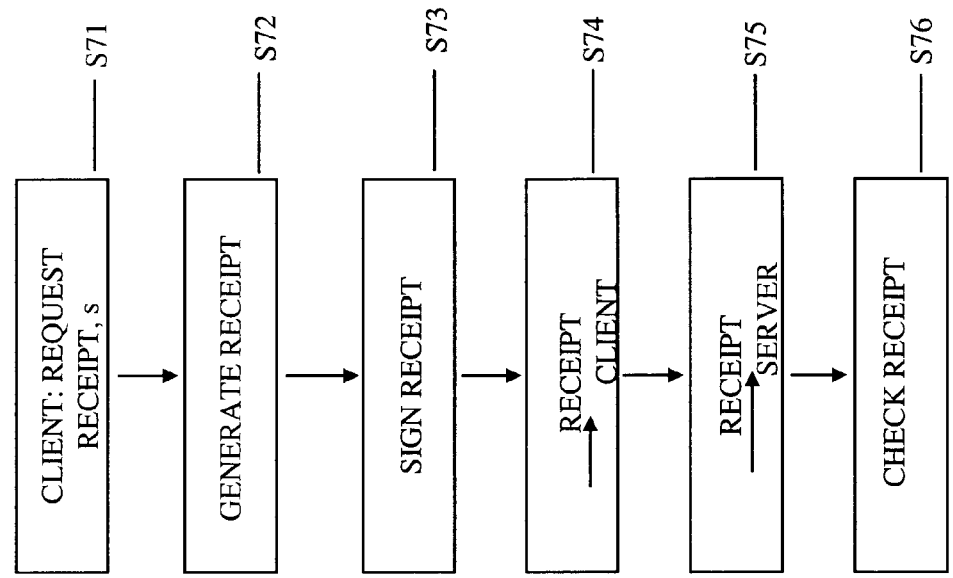
FIG. 7 is a flow diagram showing in further detail the receipt phase.

In setting up the session, the customer has previously negotiated an agreement with the service provider as to the QoS level for the session. For an application such as video on demand this level may be stringent: for example the customer may require that no application-level frame is lost in transmission. If then this QoS level is not met, then the customer requests a refund from the service provider. The request for refund might specify, for example, that there was frame loss at a specified time into the video transmission. In processing such a request, the server requires a receipt from the customer. As shown in FIG. 7, in step s71 the client requests a receipt for a specified session s from the secure module. The secure module reads the data which it recorded for that session and generates a receipt containing that data (s72). The secure module signs the receipt with the secure module's private key (s73). The secure module returns the signed receipt to the client (s74). The client in turn transmits the signed receipt to the server (s75). The server checks the signature on the receipt using the public key of the secure module (s76). The public key may be read from a database stored at the server. Having verified the signature, the server can then check the customers claim for a refund using the data contained in the receipt. This data may show, for example, a discrepancy between the number of frames decrypted in a session and the number transmitted by the server, thereby substantiating the customer's claim that a frame was lost.

Using the following notation, sign(k,d)—d signed with key k (i.e. d and the signature of d with k)
    enca(k,d)—d encrypted asymmetrically with key k
    encs(k,d)—d encrypted symmetrically with key k
the steps described above may be summarised as follows:

1. Confirming the Secure Space ID

The object here is to confirm that the secure space is one that the sender can trust.
1. Sender generates a random string r (a nonce)
2. Sender sends r to receiver
3. Receiver sends r to secure space
4. Secure space signs r with private key s to produce sign(s,r)
5. Secure space returns sign(s,r) and public key p signed by TTP with its private key t (producing sign(t,p)) to receiver
6. Client returns [sign(s,r), sign(t,p)] to sender
7. Sender checks sign(t,p) with TTP (either by invoking TTP server or using cached TTP public key)
8. Sender checks sign(s,r) with p 2. Setting up the Keying System for Decoding Data The sender needs to set up the keying system so that it can generate a sequence of numbers for decoding each packet. This sequence will be some chaotic/pseudo-random sequence.
1. Sender generates a seed value v
2. Sender generates a session key k
3. Sender encrypts v using secure space's public key p producing enca(p,v).
4. Sender sends [k,enca(p,v)] to client
5. Client sends [k,enca(p,v)] to card
6. Keying system sets packet counter to zero
7. Keying system decyphers enca(p,v) using secret key s
8. Keying system initializes sequence generator with v The session information may comprise:

Sent in plain:
    Session Key
Sent encrypted:
    Seed value
    Sequence generator type
    Receipt type (for non-repudiation)
    Maximum number of keys to generate (for multicast key management).

In this scenario there are a limited number of sequence generators and receipts that can be used as it is identifiers that are being sent over as part of the session information. Alternatively a secure class loader may be implemented that allows new sequence generators and receipts to be uploaded into the encryption system.

Another aspect of session setup is session amendment. The user may pay to receive a certain amount of data and then later on pay for some more. This may be handled by updating the session information (e.g. by increasing the maximum number of keys to be generated) while the session is active.

3. Receiving and Decyphering Data

The sender sends a sequence of frames to the receiver, each with a frame number and a session key.
1. Sender encrypts frame fn,k with frame key xn,k to produce encs(xn,k,fn,k) for frame n within session k
2. Sender sends encs(xn,k,fn,k) to receiver
3. Receiver requests key xn,k for frame n in session k from keying system.
4. Keying system records request with receipt object (for non-repudiation)
5. Keying system returns key xn,k to receiver
6. Receiver decyphers encs(xn,k,fn,k) using xn,k to obtain fn,k.

4. Generating a Receipt (for Non-Repudiation)
1. Receiver requests receipt for session key s from keying system
2. Keying system generates receipt for session key k, ck.
3. Keying system signs ck with private key s giving sign(s,ck)
4. Keying system returns sign(s,ck) to receiver
5. Receiver sends sign(s,ck) to sender
6. Sender checks sign(s,ck) against public key p of keying system known to be used by the client (database lookup)
7. Sender refunds if necessary The sequence used for generating the keys in the above examples may be distributed to customers terminals using HTTP (hypertext transfer protocol) as Java code. A suitable chaotic function is:

$$x_{n+1}=4rx_n(1-x_n)$$

When r=1 this function takes and generates numbers in the range 0 to 1. A chaotic function such as this has the property that any errors in the value of $x_n$ grow exponentially as the function is iterated. In use, the secure module uses a higher accuracy internally than the accuracy of the key values exposed to the client. For example the secure module may use 128-bit numbers internally and then only return to the client the most significant 32 bits. In generating the key values, the chaotic function is iterated until the error in the value returned to the client grows bigger than the range. This then prevents the user guessing the sequence from the values returned by the secure module.

As an alternative or additional security measure, a different function may be used for each session. This serves to further reduce the possibility of the customer predicting key values.

Figures 10A, 10B:
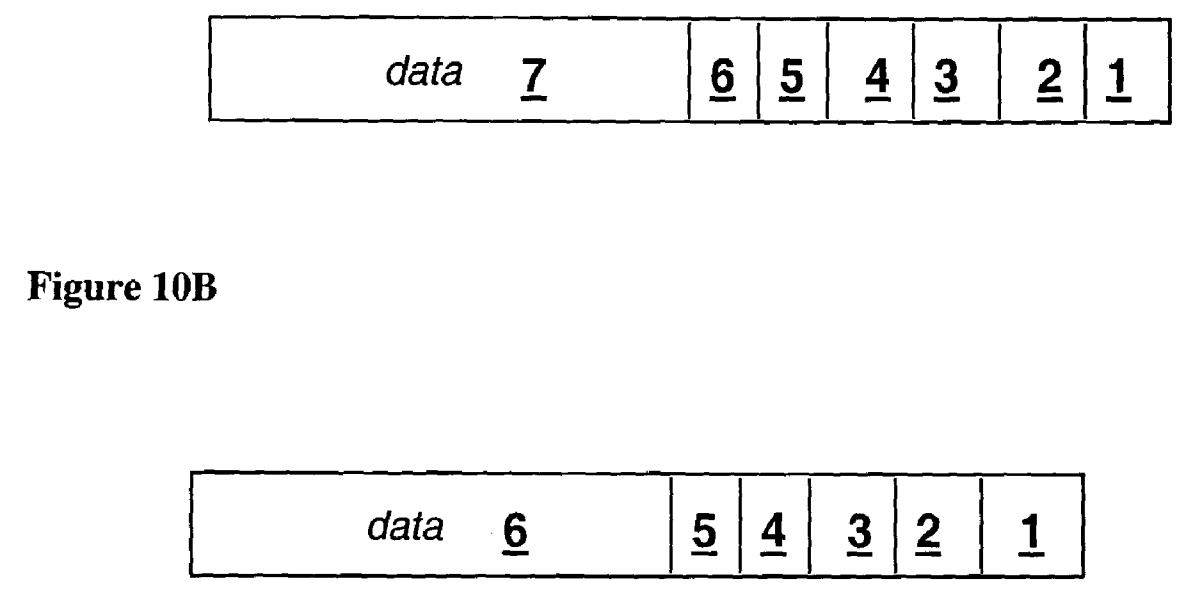

FIG. 10A shows the format of a frame transmitted in a first implementation of the system described above. The frame format is as follows:
1. Signature of Hash (2)
2. Hash of 3, 4, 5, 6
3. Key ID
4. Stop flag (y/n) (encrypted)
5. Contact sender flag (y/n) (encrypted)
6. Card IDs (encrypted)
7. Frame data The frame is received at the network interface of a customer terminal and fields 1 to 6 are passed to the secure module. These comprise an encrypted block containing control fields as well as a key identity. This block is decrypted within the secure module. If the card ID is that of the secure module in question, then the secure module checks fields 4. and 5., the stop flag and contact sender flag. If the stop flag is set then no more keys are passed out. If the contact sender flag is set then the card does a remote procedure call to the sender (or the sender's representative) and gets a new key generation policy. The secure module then, unless instructed otherwise by the control fields, passes a key out for use in decrypting the frame data contained in field 7. The total length of the control fields passed to the secure module, and in particular the number of Card ID's (field 6), may be variable, in which case, in addition to the fields shown, a further, unencrypted field is included before the control fields to indicate the total length of the control message. If the secure module does not receive a control field then it ceases to release keys. In this way neither accidental loss of a control message, nor intentional removal of such a message, can result in the customer gaining unauthorised access to data.

FIG. 10B shows the format of a frame transmitted in a second implementation of the system described above. The frame format is as follows:
1. Signature of Hash (2) (signed with sender's public key)
2. Hash of 3, 4, and 5
3. Key ID
4. Control message (encrypted)
5. Card ID(s) (encrypted)
6. Frame data The stack passes fields 1, 2, 3, 4 and 5 into the secure module to receive the key for 6. The use of this frame format relies upon a probablistic approach to controlling access. Every time a frame is sent it contains an encrypted control message and card ID which must be passed into the secure space along with the key ID to obtain the key. The control message may be a code representing the command "pass out no more keys". If the card receives this and the card ID(s) relate to it, it executes the command. If several users need to be excluded from a session, then their card IDs are rotated through different packets. In these examples the card ID constitutes the "user identity field" referred to in the claims below.

Figure 11:
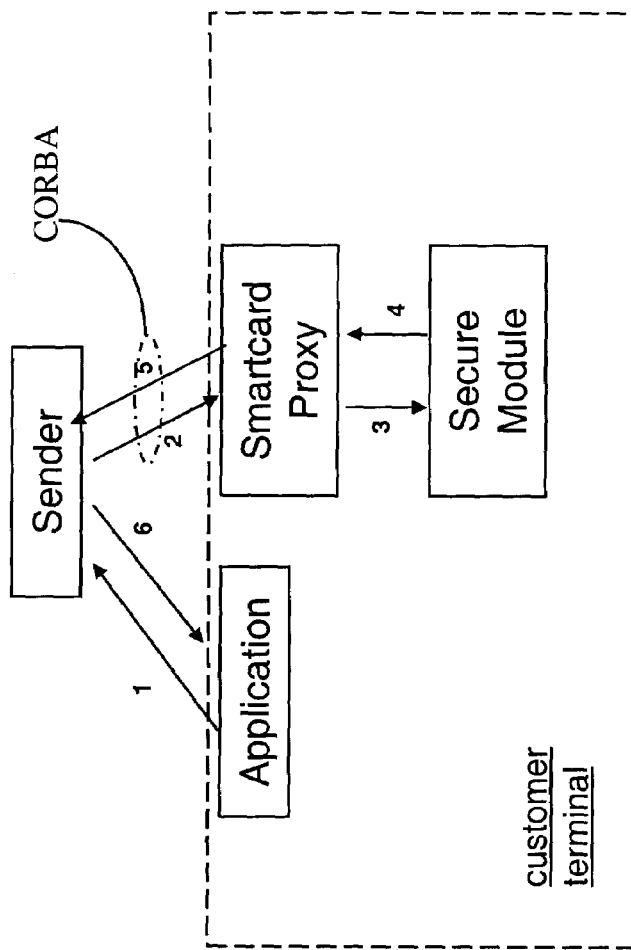
FIG. 11 shows message flows in the data communications system.

FIG. 11 shows the message flows involved in setting up a session. Message 1 is a request from an application on the customer terminal for access, for example, to 100 frames of data. This message may be followed by other transactions (not shown) in the course of which the customer pays for the requested data, for example using a credit card number. Subsequently the sender transmits a set-up message, message 2, to a secure module proxy on the customer machine. The control field from this set-up message is passed on to the secure module itself (message 3). The field may specify, for example, the number of keys to be generated and for which frame numbers. It may also contain the seed value for key generation. An acknowledgement is then returned from the secure module to the proxy (message 4) from the proxy to the sender (message 5) and from the sender back to the application which generated the initial request (message 6). The interface between the sender and the proxy, indicated by the dashed ellipse, might be implemented, for example, using Java RMI (remote method invocation) or, as in this case, a CORBA interface.

To enhance the security of the system by reducing the possibility of key values being predicted by the user, data frames may be encrypted using two key sequences instead of one. The first is for the frame encryption key as described previously. The second sequence is for a frame identification key. Each packet within a frame would contain at least a frame sequence number n, which may be incremented from zero and a frame identification key $i_n$ which is generated from the second sequence, and the data that is encrypted with a key $e_n$ generated from the first sequence. To decrypt the data requires the key $e_n$ from the decryption system. It identifies the key by supplying n and proves that it has a frame that was encrypted with that key by supplyin $i_n$. To break the sequence the attacker can only use a limited number of keys unless he/she can break the identification sequence from the same limited number of keys. Additional protection could be provided by making the sequence generator refuse to provide more keys if the application provides an incorrect frame identification key and, optionally, refusing to allow the application to re-initialize the session.

Figure 12:
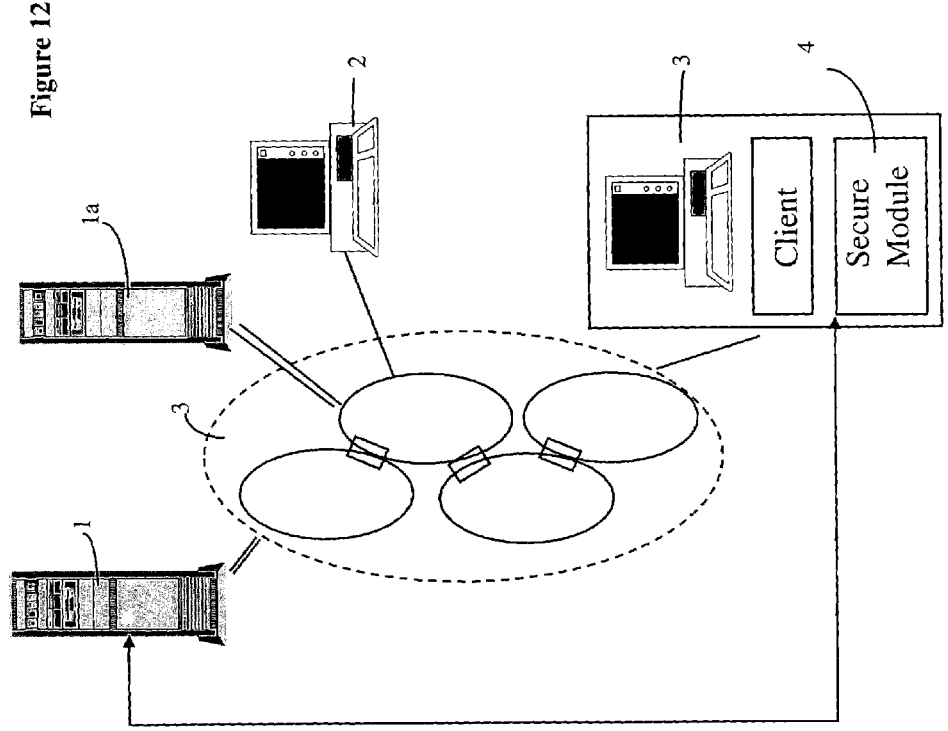
FIG. 12 shows the network of an alternative embodiment

FIG. 12 shows a further alternative embodiment, in which multiple data sources 1,1a communicate data to the customer terminals. Although, for ease of illustration, only two data sources are shown, in practice the system may include many more sources. Where multiple sources are generating data, it is possible to use the invention on a per-source basis, with each receiver entering into the setup phase with each source. However, for large numbers of sources, this becomes unscalable and time-consuming. Instead, in a preferred implementation, a sequence id of any ADU arriving at any receiver consists of two parts, the sender id and the per-sender sequenceid. The sender id may be its IP address and port number, in which case these would already be in the header of each packet. The sender id acts as an offset to the primary seed to produce a secondary seed (e.g. by XORing it with the seed). Thus each smart card operates as many key sequences as it hears senders, each sequence effectively seeded from the same primary seed, but then offset to a secondary seed before starting each sequence in a similar way to the pseudo-random or chaotic sequences described below.

Whenever an ADU arrives, the sender id is examined to look-up the correct sequence, then the sequence id allows the correct key to be generated. This allows each receiver to only pass through the set up once for all senders in a multi-sender session.

The session initiator generates the primary seed and passes it to each sender using regular cryptograpic privacy (e.g. under the public key of each sender). Each sender offsets the primary seed with their own id to produce their secondary seed, which they would use to start the key sequence for ADUs they sent.

Any sender may take any receiver through the setup phase by passing it the primary seed, assuming there is some way for any sender to establish who was an authorised receiver (e.g. a list supplied and signed by the session initiator, or a token the initiator gave to each receiver in return for payment, which each receiver had to reveal to any sender).

The examples described above may be used in the context of a community of interest network (COIN) or a virtual private network (VPN). In this case each source of information would split its data into ADUs and transmit each ADU encrypted with different keys across the COIN. The same ADU would always be transmitted with under the same key no matter how many times it was transmitted to different parties within the COIN. Sources of information might be direct, such as the parties involved in the COIN or indirect such as Web servers or caches commonly accessible to all parties within the COIN. In the indirect case, the information would be sent to the Web server or cache with its sequence number in the clear but data encrypted. It would be stored in the same encrypted form as it had been first transmitted. Only when the final recipient accessed the Web server or cache would their smart card generate the key for decryption and record receipt of the information. The watermarking techniques described previously could be used if tracing of who was passing on decrypted data was required.

Table 1 below list Java code for implementing a chaotic function. It returns the next number in a sequence, or the nth number in a sequence.

The key values need not necessarily be generated by a sequence. Instead other functions of the form k=f(seed, frame i.d.), where k is a key value, may be used. For example, the binary values of the frame identity might be used to select which of a pair of functions is used to operate on the seed value. Preferably a pair of computationally symmetric functions are used. For example, right or left-shifted XOR (exclusive OR) operations might be selected depending on whether a binary value is 1 or 0. If we label these functions A and B respectively, then, e.g., frame number six, i.e. 110, has a key generated by successive operations AAB on the seed value.

```
** Class to implement a chaotic sequence */
public class SecureSequence {
    protected int seqNum;
    protected double currNum;
    /** Create a SecureSequence object from a new seed */
    public SecureSequence (double currNum) {
        seqNum = 0;
        this.currNum = currNum;
    }
    /** Return the next number in the sequence */
    public int next( ) {
        ++seqNum;
        for (int i = 0; i < 20; ++i) // 20 iterations is a guess,
could use less
            currNum = 4 * currNum * (1 - currNum);
        // return the most significant 32 bits of a 64 bit number
        return (int)((double)Integer.MAX_VALUE * currNum);
    }
    /** Return the current sequence number of the last number
returned */
    public int sequenceNumber( ) {
        return seqNum;
    }
        /** Return the number in the sequence at the requested
position in
            the sequence */
    public int next(int seqNum) {
        // if the number is too small return zero (should really be
an exception)
        if (seqNum <= this.seqNum) return 0;
        // iterate through the sequence to get to the right number
        while (this.seqNum != seqNum)
            int value=next( );
        return value;
    }
}
```

What is claimed is:

1. A method of distributing digitally encoded data, comprising:
   a) dividing said data into a multiplicity of frames,
   b) encrypting said frames,
   c) distributing multiple copies of the said data frames to a multiplicity of users, each frame being distributed with a control field,
   d) communicating a seed value for key generation to respective secure modules located at each of the multiplicity of users,
   e) decrypting the data frames at respective users using keys derived from the seed value communicated to the secure module, the secure module being arranged to enable decryption of a respective frame only when said control field has been passed to the secure module,
   f) passing a control message, for modifying and controlling the availability of keys, in the control field to the secure module at a selected one or more users, and g) at the secure module of the or each selected user, in response to the said control message, controlling the availability of keys generated from the said seed value, thereby controlling access by the users to the said data.

2. A method according to claim 1, in which each data frame includes a frame identity field, and each key generated by the secure module is specific to one frame identified by the said field.

3. A method according to claim 1, in which the step of distributing multiple copies of the said data comprises multicasting packets of data via a communications network to the plurality of users.

4. A method according to claim 1, in which the control message is distributed with a data frame to the multiplicity of users, a user identity field identifying a selected user or group of users is included in the control message, and the control message is acted on only by the user or group of users identified by the said user identity field.

5. A method according to claim 1, in which the control message includes a stop flag, and in response to the stop flag the generation of keys at the or each selected user is stopped.

6. A method according to claim 1, including returning a response signal from the secure module to the source of the control message.

7. A method according to claim 6, in which the control message includes a contact sender flag, and the step of returning a response signal from the secure module is carried out when the contact sender flag is set.

8. A method according to claim 6, including transmitting a further control message to the user on receipt of the said response signal.

9. A customer terminal for use in a method according to claim 1, the customer terminal comprising:
a) a data interface for connection to a data communications channel;
b) a key generator programmed to generate from a seed value keys for use in decrypting data frames:
c) decryption means connected to the data interface and the key generator and arranged to decrypt data frames received via the data interface; and
d) key control means connected to the key generator, the key control means comprising:
an interface for receiving control fields; and
control means arrange to only release keys for decrypting those respective data frames received with a control field;
the control means being arranged to in response to control messages in the control fields, control the availability to the user keys generated from the seed value.

10. A data server for use in method according to claim 1, the data server comprising:
a) a data interface for connection to a data communications channel;
b) means for outputting encrypted data frames with control fields via the data interface onto the communications channel for receipt by a multiplicity of customer terminals;
c) means for outputting the control fields having control messages onto a data communications channel for controlling the operation of key generators at customer terminals.

11. A method according to claim 1, including generating keys from the seed value by iterated operations on the seed value by selected ones of a plurality of predetermined functions.

12. A method according to claim 1, including applying different characteristic variations to data decrypted at different respective customer terminals.

13. A method according to claim 1, including a plurality of remote data sources, each outputting a respective plurality of frames.

14. A method according to claim 13, in which the customer terminal receives a primary seed value common to different respective data streams from the plurality of data sources, and derives from the common primary key a plurality of different respective secondary seed values for decrypting frames from different respective data sources.

15. A method according to claim 14, in which data received from different data sources includes different respective source identity values, and the respective secondary seed value is generated from the primary seed value by modifying the primary seed value with the source identity value.

16. A method according to claim 1, in which each data frame includes a frame type field.

17. A method according to claim 16, including storing a receipt including data from the frame type field.

18. A method as in claim 1, wherein the control message received by the secure module causes the secure module to cease releasing keys.

19. A method as in claim 1, wherein each of the frames is encrypted with a different key.

20. A method of operating a customer terminal in a data communications system, the method comprising:
a) receiving at the customer terminal a multiplicity of encrypted data frames, each with a control field;
b) receiving at the customer terminal a seed value for key generation;
c) passing the said seed value for key generation to a secure module located at the customer terminal;
d) generating in the secure module using the seed value keys for the decryption of data frames;
e) decrypting using the said keys only those respective data frames for which a control field has been received;
f) passing to the said secure module a control message received in the control field; and
g) in response to the said control message, controlling the availability of keys generated using the said seed value and thereby controlling access by the user of the customer terminal to data received at the customer terminal.

21. A method as in claim 20, wherein the control message received by the secure module causes the secure module to cease releasing keys.

22. A method as in claim 20, wherein each of the frames is encrypted with a different key.

23. A data communications system comprising
a) a remote data source arranged to output a plurality of frames;
b) encryption means for encrypting the plurality of frames with different respective keys;
c) a communications channel arranged to distribute multiple copies of the encrypted data frames, each with a control field;
d) a multiplicity of customer terminals arranged to receive from the communications channel respective copies of the encrypted data frames with the control fields;
e) a key generator located at a customer terminal and programmed to generate from a seed value keys for use in decrypting data frames;
f) key control means connected to the key generator, the key control means comprising:

an interface for receiving the control fields; and control means arranged to only release keys for decrypting those respective frames for which a control field is received and being arranged to, in response to the said control messages in the control fields, control the availability to the user of keys generated from the seed value; and g) decryption means connected to the key generator and arrange to decrypt the data frames received at the customer terminal from the communications channel.

24. A data communications system according to claim 23, in which the communications channel is a packet-switched data network.

25. A data communications system as in claim 23, wherein the control message received by the key control means causes the key control means to cease releasing keys.

* * * * *